US012789870B2

(12) United States Patent
Pfeifer et al.

(10) Patent No.: US 12,789,870 B2

(45) Date of Patent: Nov. 10, 2026

(54) CABLEWAY WITH DATA COMMUNICATION BETWEEN CABLEWAY CONTROLLER AND VEHICLE

(71) Applicant: Innova Patent GmbH, Wolfurt (AT)

(72) Inventors: Daniel Pfeifer, Sankt Anton am Arlberg (AT); Clemens Mohr, Wolfurt (AT)

(73) Assignee: INNOVA PATENT GMBH, Wolfurt (AT)

(*) Notice: Subject to any disclaimer, the term of this patent is extended or adjusted under 35 U.S.C. 154(b) by 291 days.

(21) Appl. No.: 18/257,765

(22) PCT Filed: Dec. 15, 2021

(86) PCT No.: PCT/EP2021/085913

§ 371 (c)(1),
(2) Date: Jun. 15, 2023

(87) PCT Pub. No.: WO2022/129182

PCT Pub. Date: Jun. 23, 2022

(65) Prior Publication Data

US 2024/0308561 A1 Sep. 19, 2024

(30) Foreign Application Priority Data

Dec. 17, 2020 (AT) ................................ A51110/2020

(51) Int. Cl.
*B61L 27/70* (2022.01)
*B60L 5/38* (2006.01)
(Continued)

(52) U.S. Cl.
CPC ................ *B61L 27/70* (2022.01); *B60L 5/38* (2013.01); *B60L 5/42* (2013.01); *H04B 3/54* (2013.01); *H04B 3/60* (2013.01); *B61L 2205/00* (2013.01)

(58) Field of Classification Search
CPC ........ B61L 27/70; B61L 2205/00; B60L 5/38; B60L 5/42; H04B 3/54; H04B 3/60; B61B 12/06; B61B 12/00
See application file for complete search history.

(56) References Cited

U.S. PATENT DOCUMENTS 6,810,088 B1 * 10/2004 Griepentrog ............ H04B 3/54 375/259
10,432,258 B1 10/2019 Mitchell et al.
(Continued)

FOREIGN PATENT DOCUMENTS

CN 1341063 A 3/2002
CN 101976066 A 2/2011
(Continued)

OTHER PUBLICATIONS

EPO machine translated description of reference DE102017219219A1. (Year: 2017).*

(Continued)

*Primary Examiner* — Navid Z. Mehdizadeh
*Assistant Examiner* — Shelley Marie Osterhout
(74) *Attorney, Agent, or Firm* — Husch Blackwell LLP

(57) ABSTRACT

To allow simple data communication between a vehicle and a cableway controller of a cableway, provision is made, during operation of the cableway, for a current collector of the vehicle to come into contact with a busbar through the movement of the vehicle, wherein a vehicle powerline modem of the vehicle is connected to the current collector and a control powerline modem is connected to the busbar and the cableway controller and, while the current collector is in contact with the busbar, a powerline communication connection is established between the vehicle powerline
(Continued)

modem and the control powerline modem and is used to transmit vehicle data from the vehicle to the cableway controller or vice versa.

12 Claims, 2 Drawing Sheets

(51) Int. Cl.

| | |
|---|---|
| ***B60L 5/42*** | (2006.01) |
| ***H04B 3/54*** | (2006.01) |
| ***H04B 3/60*** | (2006.01) |

(56) References Cited

U.S. PATENT DOCUMENTS

| | | | | |
|---|---|---|---|---|
| 10,737,704 | B2 | 8/2020 | Scherler | |
| 10,784,925 | B2 | 9/2020 | Mitchell et al. | |
| 11,332,166 | B2 | 5/2022 | Mohr | |
| 2010/0085183 | A1 | 4/2010 | Gubler | |
| 2014/0070767 | A1* | 3/2014 | Morris | B60L 5/42<br>320/109 |
| 2014/0323040 | A1* | 10/2014 | Rhein | H02J 50/40<br>455/41.1 |
| 2017/0043792 | A1* | 2/2017 | Schertler | B61B 7/04 |
| 2018/0229611 | A1* | 8/2018 | Peyerl | B60M 7/003 |
| 2020/0106480 | A1* | 4/2020 | Mitchell | H04L 67/12 |
| 2021/0024110 | A1 | 1/2021 | Pfeifer | |

FOREIGN PATENT DOCUMENTS

| | | | |
|---|---|---|---|
| CN | 110740917 | A | 1/2020 |
| CN | 110971270 | A | 4/2020 |
| DE | 102017219219 | A1 * | 5/2019 |
| EP | 2067682 | A1 | 6/2009 |
| EP | 3476686 | A1 | 5/2019 |
| JP | H02231263 | A | 9/1990 |
| JP | 2020083234 | A | 6/2020 |
| WO | 2015196221 | A1 | 12/2015 |
| WO | 2017076896 | A1 | 5/2017 |
| WO | 2018228965 | A1 | 12/2018 |
| WO | 2018228971 | A1 | 12/2018 |

OTHER PUBLICATIONS

Search Report dated Oct. 29, 2021 for Austrian Patent Application No. A51110/2020.

International Search Report and Written Opinion dated Mar. 31, 2022 for International Pat. Appl. No. PCT/EP2021/085913.

Chinese Office Action issued on Jun. 20, 2025 in Chinese Application No. 202180085278.1.

* cited by examiner

CABLEWAY WITH DATA COMMUNICATION BETWEEN CABLEWAY CONTROLLER AND VEHICLE

CROSS REFERENCE

This application is a U.S. National Phase Application of International Application No. PCT/EP2021/085913 filed on 15 Dec. 2021, which claims priority to Austrian Patent Application No. A51110/2020 filed on 17 Dec. 2020, the disclosures of each of which are expressly incorporated herein by reference in their entirety.

TECHNICAL FIELD

The present disclosure relates to a method for data communication between a cableway controller and at least one vehicle of a cableway, wherein a current collector of the vehicle contacts a busbar by the movement of the vehicle during operation of the cableway. The present disclosure also relates to a cableway having such data communication.

BACKGROUND

Cableways are used for transporting people or goods. For this purpose, a number of cable-drawn vehicles of the cableway are moved between at least two stations. Typical cableways are aerial cableways comprising vehicles suspended in the air on a support or hoisting cable, such as gondolas, cabins, or chairs, or funicular railways comprising cable-drawn vehicles traveling on rails or other guideways. Various sensors can be provided on vehicles of a cableway, which sensors detect data during the travel of the vehicle. The data can be stored on the vehicle and transmitted to the cableway controller at certain points of the cableway.

However, it can also be provided to transmit the data to the cableway station without being stored. Examples of such a sensor are a wind sensor that measures the wind speed at the vehicle, or an inclination sensor that measures an inclination relative to the perpendicular, or an acceleration sensor or a gyroscope that measures an oscillation of a vehicle. Another example is the locking monitoring of a door or a safety bar of a vehicle. The status of the locking is detected in the station and transmitted to the cableway controller. Only when the locking is correctly activated is the vehicle allowed to move out of the cableway station.

Other data which can be detected on a vehicle are, for example, an interior temperature, status data of an electrical power supply of a vehicle (for example a state of charge (SOC) or a state of health (SOH) of a battery), a seat occupancy, etc., for which suitable sensors are provided on the vehicle which generate data. Such data can be used in the cableway controller for monitoring the function and control of the cableway, for example the control of the cable speed, function monitoring for detecting error states, maintenance planning, etc.

For certain functionalities, it is desirable to be able to uniquely identify a vehicle. Therefore, vehicles of a cableway can also be provided with a unique vehicle identification which is read out at certain locations and is transmitted to the cableway controller, if necessary together with other data, so that the data can be assigned to a specific vehicle. The vehicle identification is stored, for example, in a memory of the vehicle and can be read out at certain points of the cableway.

One example is the monitoring of the clamping force of a cable clamp of a vehicle. The clamping force of each vehicle can be checked during each passage through a station, for example by means of a clamping force sensor at the station. The sensor value determined using the clamping force sensor can be sent, together with the vehicle identification, to the cableway controller. In the cableway controller, the time profile of the clamping force can then be recorded and a replacement or maintenance can be initiated in good time when the clamping force approaches a critical mark. In a similar manner, other functions of the vehicle or the cableway can also be checked and monitored.

However, the transmission of data (sensor data, vehicle identification, etc.) from the vehicle to the cableway station is difficult in practice. On the one hand, a reliable energy supply on the vehicle is required for this purpose. On the other hand, the difficulty is that there is no or no reliable connection between the vehicle and the cableway controller during normal operation of the cableway. WO 2018/228971 A1 and WO 2018/228965 A1 disclose, for example, a data transmission based on RFID (Radio Frequency Identification) transponders.

For this purpose, an RFID tag is arranged on the vehicle. As soon as the RFID tag comes into the transmission range of an RFID transmitter/receiver, which is arranged, for example, in the cableway station, the RFID tag transmits its data to the RFID receiver. The RFID transponder can in this case also obtain the required electrical energy from the transmission signal of the RFID transmitter. However, the data communication by means of RFID requires additional hardware on the vehicle and the cableway, such as antennas, RFID tags, RFID transmitters/receivers, cabling to the cableway controller, etc. Apart from this, the RFID transmission is sensitive to the harsh environmental conditions (temperatures, moisture, ice, snow etc.) in the vicinity of a cableway, which can negatively affect the availability of the transmission channel. In particular in safety-critical applications, such as door locking monitoring, this may constitute a problem.

It is an object of the present disclosure to provide an alternative data transmission between a vehicle of a cableway and a cableway controller which is simple to implement.

SUMMARY

Embodiments of the present disclosure may use powerline communication for data communication between a vehicle and the cableway controller. Existing devices, in particular electrical lines and connections, of the cableway can thus be used for the powerline communication. Only powerline modems and, if necessary, a small electrical buffer storage are to be provided, which, however, entails only little effort and costs. Any vehicle data (control data, sensor data) can be transmitted via the powerline data communication, as a result of which the powerline data communication can also be used very flexibly and in a variety of ways, and in particular also at different points of the cableway. It can thus also be provided to exchange different vehicle data between a vehicle and the cableway controller at different points of the cableway.

Advantageously, the data communication according to the present disclosure can transmit control data to a (preferably electrical) consumer of the vehicle as vehicle data, by means of which a function of the vehicle is controlled. Also advantageously, the cableway controller can obtain vehicle data in the form of sensor data from the vehicle, by means of which the cableway can be controlled or monitored. The powerline data communication thus enables both the unidirectional data communication between the vehicle and the cableway controller or vice versa, or also bidirectional data communication.

Since the powerline data communication cannot be maintained permanently, but only in the region of a busbar, it is advantageous if sensor data are stored in a memory unit of the vehicle during a period of time without contact between the current collector and busbar and, during a period of time with contact between the current collector and the busbar, are transmitted from the memory unit to the cableway controller by means of the vehicle powerline modem. In this way, it can be ensured that no sensor data are lost.

In addition, the busbar can also be used for the electrical supply of the vehicle. Since such electrical supplies via busbars are conventional in cableways, this means on the other hand, that such an existing electrical supply can be expanded in a simple manner by the powerline data communication.

These objects are merely illustrative of the features and advantages associated with the present disclosure and should not be deemed as limiting in any manner. These and other objects, features and advantages of the present disclosure will become apparent from the following detailed description when taken in conjunction with the referenced drawings.

BRIEF DESCRIPTION OF THE DRAWINGS

Reference is now made more particularly to the drawings, which illustrate the best presently known mode of carrying out the present disclosure and wherein similar reference characters indicate the same parts throughout the views.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. The following definitions and non-limiting guidelines must be considered in reviewing the description of the technology set forth herein.

In the following detailed description numerous specific details are set forth in order to provide a thorough understanding of the present disclosure. However, it will be understood by those skilled in the art that the present disclosure may be practiced without these specific details. For example, the present disclosure is not limited in scope to the particular type of industry application depicted in the figures. In other instances, well-known methods, procedures, and components have not been described in detail so as not to obscure the present disclosure.

The headings and sub-headings used herein are intended only for general organization of topics within the present disclosure and are not intended to limit the disclosure of the technology or any aspect thereof. In particular, subject matter disclosed in the "Background" may include novel technology and may not constitute a recitation of prior art. Subject matter disclosed in the "Summary" is not an exhaustive or complete disclosure of the entire scope of the technology or any embodiments thereof. Classification or discussion of a material within a section of this specification as having a particular utility is made for convenience, and no inference should be drawn that the material must necessarily or solely function in accordance with its classification herein when it is used in any given composition.

The citation of references herein does not constitute an admission that those references are prior art or have any relevance to the patentability of the technology disclosed herein. All references cited in the "Detailed Description" section of this specification are hereby incorporated by reference in their entirety.

Figure 1:
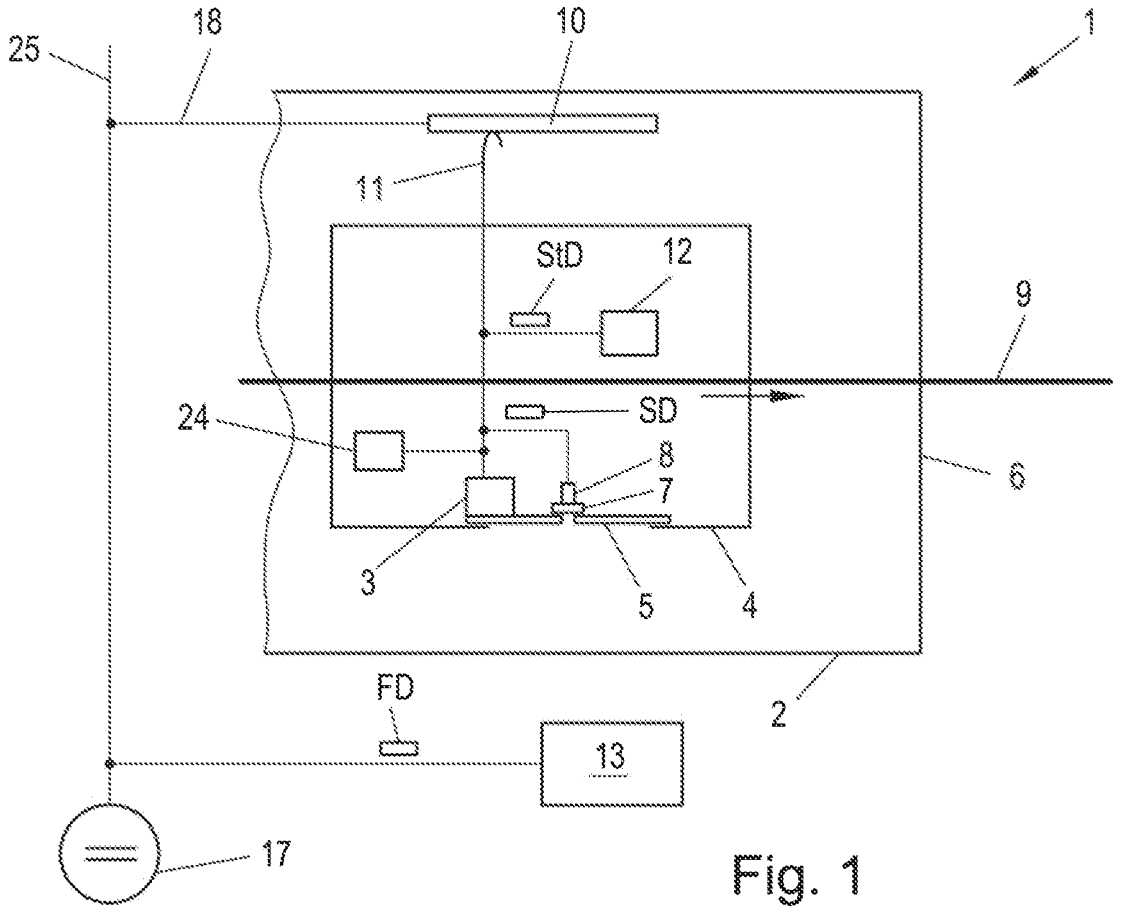
FIG. 1 is a schematic view of a station of a cableway with a vehicle having a vehicle sensor according to an embodiment of the present disclosure.

In FIG. 1, a first station 2 of a cableway 1 is indicated. Well-known devices of the cableway 1 in the station 2, such as a bullwheel for the cable 9, a cable drive or tensioning devices for the bullwheel, a conveyor drive for moving vehicles decoupled from the cable etc., on the vehicle 4, such as suspension gear, cable clamps, etc., and on the track, for example supports having support rollers for the cable 9, etc., or a second station, are not shown because they are not relevant to the present disclosure. By means of the cable 9, at least one vehicle 4 is transported between the first station 2 and a second station that is not shown. For this purpose, the vehicle 4 can be fixedly connected to the cable 9 in a well-known manner or can be detachable from the cable by means of spring-actuated cable clamps. The connection of the vehicle 4 to the cable 9, for example in the form of suspension gear, is also known and therefore not shown. Likewise, a plurality of cables 9 can also be provided in a known manner, for example a fixed, locked track rope on which a running gear of the vehicle 4 runs, and a moving haul cable, by means of which the vehicle suspended on the track rope is moved. The present disclosure, without loss of generality, uses the example of a cabin as a vehicle 4. In the embodiment shown, the vehicle has a sliding door as a closure device 5.

A vehicle sensor 8, which detects a specific state of the vehicle 4 and generates sensor data SD, can be provided on the vehicle 4. The vehicle sensor 8 can, as in FIG. 1, detect the state of a locking unit 7 of the closure device 5, for example. In addition, there is naturally also a plethora of other possible vehicle sensors 8, for example a sensor for detecting a seat occupancy of the vehicle 4 with persons, or a temperature sensor for detecting the interior temperature of a cabin or an external temperature, or a voltage sensor or current sensor for detecting a supply voltage of an electrical power supply of the vehicle, or an acceleration or inclination sensor, etc. A memory unit 24 for storing sensor data SD can also be provided on the vehicle 4. The memory unit 24 is preferably a non-volatile memory, for example a semiconductor memory, such as an SSD (Solid State Drive), EPROM or flash memory, a hard disk, etc., but can also be a volatile memory, such as a RAM (Random Access Memory) memory, etc. Sensor data SD can also be data derived from other sensor data SD and possibly stored in the memory unit 24, for example a state of charge of a battery could be determined from a supply voltage of a battery. A vehicle identification FID can also be stored in the memory unit 24, which can also be read out as sensor data SD.

However, it is also possible to transmit control data StD from the station 2 to vehicle 4 in order to control a consumer 12. Such control data StD are usually control commands or communication data. For example, control commands for controlling an air-conditioning system, a fan, a seat heater, a window heater, a light, etc. can be used. The consumers 12 naturally have corresponding interfaces in order to be able to receive and implement the control commands. For example, communication data can make it possible to speak from the station 2 into the vehicle 4 (in combination with sensor data of a microphone also as two-way communication) or a WLAN connection for the passenger (if necessary in combination with corresponding sensor data of a mobile terminal device of the passenger) can be made possible with communication data.

Within the meaning of the present disclosure, both sensor data SD and control data StD are understood as vehicle data FD, wherein it is not essential for sensor data SD and control data StD to be used. In unidirectional communication, for example, only sensor data SD or only control data StD are transmitted, and in bidirectional communication both.

A locking unit 7, for example, is provided on the vehicle 4, by means of which locking unit the closed closure device 5 is locked, so that an inadvertent or improper opening of the closure device 5 is prevented. For this purpose, for example control data StD could be transmitted from a cableway controller 13 to the closure device 5, in order to actuate the closure device 5 for closing and the locking unit 7 for locking the closed closure device 5. The state of the locking unit 7 can be detected by means of a locking monitor 8. The locking monitor 8 is designed as a vehicle sensor 8, for example as a limit switch with a double contact (NC contact, NO contact), which detects the locking state of the locking unit 7, i.e. whether or not locking has taken place. The locking state can be transmitted as sensor data SD to a cableway controller 13. A data connection between other consumers 12 of the vehicle 4 and the cableway controller 13 can be realized in a similar manner. The consumer 12 can be a display unit (e.g. a loudspeaker, monitor, signal light, etc.), illumination, an electric closure drive 3 of a closure device 5 of the vehicle 4, a vehicle energy storage 20, an air conditioning system, a fan, a seat heater, a window heater, a WLAN modem, etc.

A busbar 10 is provided in the station 2, via which busbar the vehicle 4 or a consumer 12 of the vehicle 4 can be supplied with electrical energy as required. For this purpose, a current collector 11, for example a sliding contact, is provided on the vehicle 4, which electrically contacts the busbar 10 at least temporarily. Preferably, the current collector 11 comes into contact with the busbar 10 for a certain time during the movement of the vehicle 4. The busbar 10 can serve for the electrical supply of at least one electrical consumer 12 of the vehicle 4.

For example, in the station 2 the closure device 5 is opened by means of an electric closure drive 3, in order to allow passengers to exit and board. For this purpose, the vehicle 4 can be at a standstill in the station 2 or be moved through the station 2 at a low speed. Before the station exit 6 of the station 2, the closure device 5 is electrically closed by means of the electric closure drive 3. During the power supply via the busbar 10, the electric closure drive 3 can be actuated in order to open or close the closure device 5.

Of course, a plurality of busbars 10 can be provided in the station 2. For example, a first busbar 10 in the region before a boarding and exit point or after a station entrance, in order to supply electrical energy to the electrical closure drive 3 for opening the closure device 5. In the region before the station exit 6 from the station 2, a further busbar 10 can be provided, in order to supply the closure drive 3 with electrical energy for closing the closure device 5. However, it is of course also possible for only a single busbar 10 to be provided for the electrical supply of the closure drive 3 in the station 2. A busbar 10 can also be provided at any other location of the cableway 1, for example on a cableway support between the stations 2 or before a station entrance or after a station exit 6.

However, a busbar 10 extends only a certain length in the direction of movement of the vehicle 4, but not along the entire range of movement of the vehicle 4. If the busbar 10 is arranged in a station 2, the busbar 10 then extends a certain length in the station 2, in the direction of movement. Usually, the length of a busbar is significantly shorter than the entire range of movement of the vehicle 4.

Furthermore, a cableway controller 13 is provided which controls and monitors the operation of the cableway 1. The cableway controller 13 can be arranged at any point of the cableway 1, either in the first station 2 or another station. A distributed control of the cableway 1 with a plurality of connected control units is also conceivable in principle as a cableway controller 13. The cableway controller 13, or a single control unit of the cableway controller, can be designed as processor-based hardware, on which control software runs, for example a computer, a microprocessor or a programmable logic controller. An implementation as an integrated circuit (IC), such as an application-specific integrated circuit (ASIC) or field programmable gate array (FPGA), is also conceivable. Individual control units can also be implemented as analog circuits. Mixed forms are also possible.

In order to transmit vehicle data FD from the vehicle 4 to the cableway controller 13 or vice versa, it is provided to use preferably existing electrical lines 25 for the electrical supply of the cableway 1, in order to establish a local network for data transmission, so that no additional cabling is necessary. Alternatively, however, a (wholly or partially) separate cabling can also be provided for the transmission of the vehicle data FD. The electrical line 25 is, for example, part of the electrical energy supply of the cableway, for example a single-phase or polyphase cableway power supply system. In FIG. 1, for example, a DC voltage (e.g. ±24 VDC) power supply 17 is provided. For transmitting the vehicle data FD, powerline communication, for example standardized or proprietary, is used, as will be explained in more detail with reference to FIG. 2.

In order to establish and implement powerline communication, a vehicle powerline modem 15 is provided on the vehicle 4, which modem is electrically connected to the current collector 11, and a control powerline modem 16 is provided in the station 2, which modem is electrically connected to the busbar 10. For this purpose, the busbar 10 is preferably arranged in a stationary manner in the cableway 1, for example on a stationary component of the cableway 1, such as in the station 2 or a cableway support. The busbar 10 and the current collector 11 are usually polyphase, for example two-phase as in FIG. 2. The control powerline modem 16 has a data communication connection to the cableway controller 13. When the current collector 11 contacts the busbar 10, a powerline communication from the vehicle powerline modem 15 via the current collector 11, the busbar 10 and the control powerline modem 16 to the cableway controller 13, and vice versa, can be established accordingly. The time period during which the current collector 11 is connected to the busbar 10 can therefore be used for powerline communication in order to exchange vehicle data FD. Since the length of the busbar 10 is limited, and the busbar 10 does not extend along the entire range of movement of the vehicle 4, the possible duration of the powerline communication is consequently also limited.

For data transmission between the vehicle 4 and the cableway controller 13 by means of powerline communication, it is provided that the current collector 11 of the vehicle 4 contacts the busbar 10 during the movement (which also comprises a standstill of the vehicle 4) at least during a certain period of time (which results substantially from the length of the busbar 10 and the speed of the vehicle 4). As explained above, the busbar 10 is connected to the cableway controller 13 via a control powerline modem 16, and the current collector 11 on the vehicle 4 is connected to a vehicle powerline modem 15. As soon as the current collector 11 of the vehicle 4 contacts a busbar 10 on the cableway 1, the establishment of communication can take place for powerline communication. The busbar 10 is thus arranged on the cableway 1 at least in a location where powerline communication is required for transmitting vehicle data FD. In the simplest case, the vehicle powerline modem 15 and the control powerline modem 16 identify an existing connection, for example by receiving a carrier frequency transmitted by one of the connected powerline modems 15, 16, and start the powerline communication. The connection establishment can also comprise the startup of the vehicle powerline modem 15, for example if it was previously without power supply and is now electrically supplied via the busbar 10, or no powerline communication was to be carried out beforehand. "Connection establishment" means, for example, that the vehicle powerline modem 15 generates the carrier frequency of the powerline communication and applying it to the current collector 11 by the vehicle powerline modem 15, as a result of which the powerline communication can take place. This typically takes approximately 1 to 2 seconds.

Signals of a vehicle sensor 8, in the embodiment e.g. in the form of a locking monitor (in the example according to FIG. 2 a limit switch having a double contact), can be evaluated in a sensor evaluation unit 14. The vehicle state monitored by the vehicle sensor 8, here e.g. the locking state, is transmitted to the cableway controller 13 as sensor data SD by means of a vehicle powerline modem 15 as a result of the evaluation in the sensor evaluation unit 14. The vehicle powerline modem 15 can of course also be integrated in the sensor evaluation unit 14. The vehicle sensor 8 can of course also transmit the sensor data SD directly without processing in a sensor evaluation unit 14 using a vehicle powerline modem 15. For this purpose, the vehicle powerline modem 15 can also be integrated in a vehicle sensor 8. The vehicle powerline modem 15 is connected to the current collector 11 for data transmission, for example via an electrical supply line 22 to the vehicle 4, which in turn is connected to the current collector 11.

The sensor evaluation unit 14 can be designed as processor-based hardware, on which evaluation software runs, for example in the form of an embedded controller or microcontroller. An implementation as an integrated circuit (IC), such as an application-specific integrated circuit (ASIC) or field programmable gate array (FPGA), is also conceivable. The sensor evaluation unit 14 can also be implemented as an analog circuit. The powerline modems 15, 16 are usually electronic components (for example a single-chip system), possibly also comprising a microprocessor and firmware.

Figure 2:
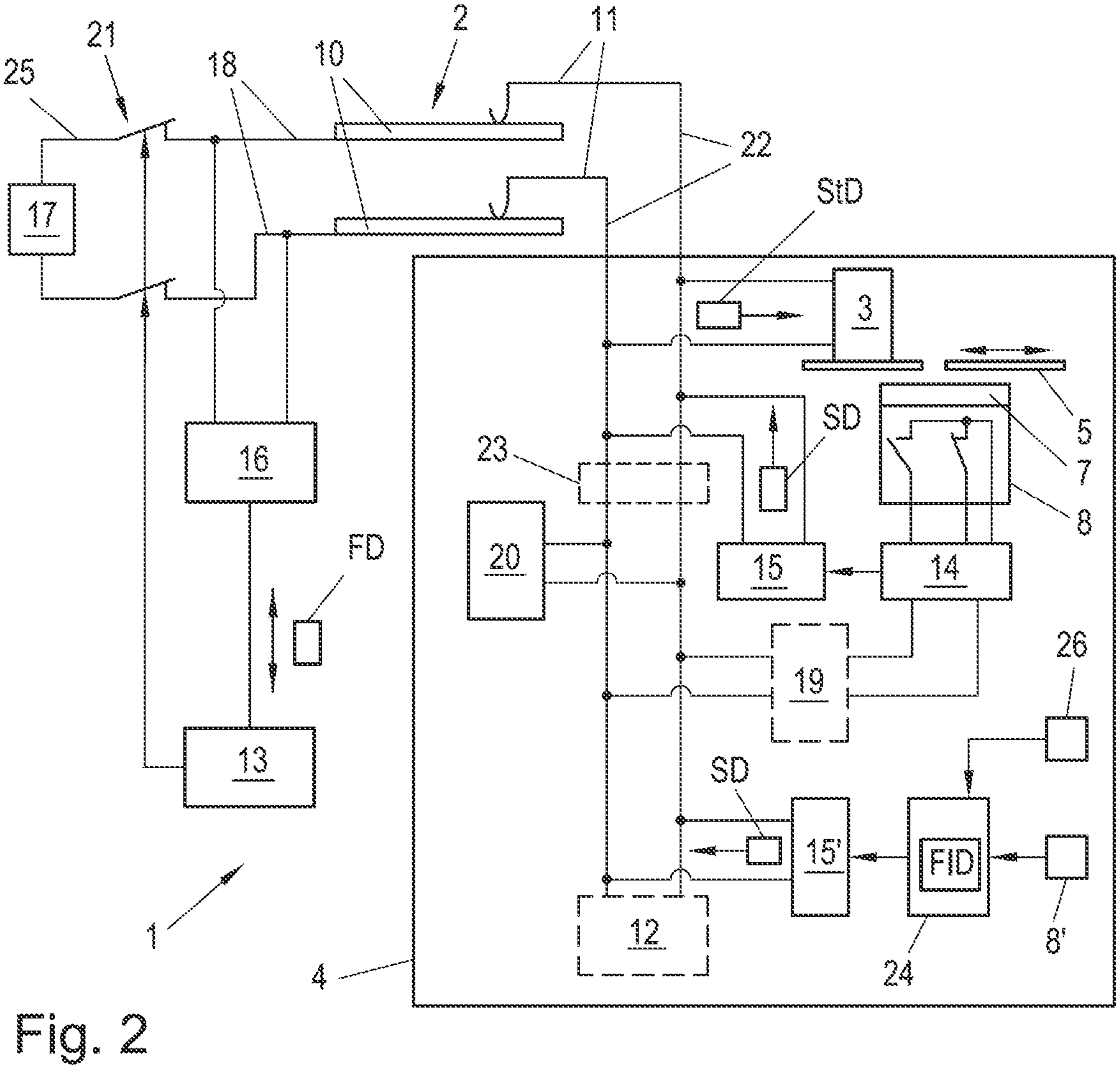
FIG. 2 is a schematic view of a powerline communication according to an embodiment of the present disclosure between the vehicle and the cableway station.

A memory unit 24 can also be provided on the vehicle 4, in order to store sensor data SD from a vehicle sensor 8', for example a 3D acceleration sensor, as shown in FIG. 2. This may be necessary, for example, when the sensor data SD are generated, if no powerline communication is possible, for example when the vehicle is located on the track between two stations 2. An unambiguous vehicle identification can also be stored in the memory unit 24. The vehicle identification FID can also be transmitted at a suitable location by means of control data StD from the cableway controller 13 to the vehicle 4 for storing in the memory unit 24. As soon as the current collector 11 comes into contact with a busbar 10, sensor data SD can be transmitted from the memory unit SD to the cableway controller 13, or conversely control data StD from the cableway controller 13 to the memory unit 24, in order to be stored therein. After the sensor data SD have been transmitted from the memory unit 24 to the cableway controller 13, it can also be provided to delete said data from the memory unit 24.

For this purpose, the memory unit 24 can be connected to the current collector 11 by its own vehicle powerline modem 15'. However, it can also be provided that only one single vehicle powerline modem 15 is provided on the vehicle 4, via which the entire powerline communication with the cableway controller 13 is executed.

If sensor data SD are temporarily stored in a memory unit 24, it is advantageous if the sensor data SD are provided with a time stamp and are stored with the time stamp. It is therefore advantageous if a time base 26, for example a real-time clock (RTC), is provided on the vehicle 4, which time base is connected to the memory unit 24 and/or a vehicle sensor 8'. The time base 26 can preferably be set by the cableway controller 13 via control data StD. The time base 26 is preferably supplied with electrical energy from the energy storage 20 of the vehicle.

Various interfaces can be implemented on a powerline modem 15, 16, as explained with reference to FIG. 3. A coupling stage 31 is provided on the powerline modem 15, 16, via which the powerline modem 15, 16 is connected to the electrical lines which are to be used for powerline communication. A digital input 32, a digital output 33, an analog input 34, an analog output 35 and a data bus interface 36 can be provided on the powerline modem 15, 16, wherein not all these have to be implemented. A cableway controller 13, a sensor evaluation unit 14 or a memory unit 24 can be connected to a digital input 32 in order to transmit digital sensor data SD or control data StD to the powerline modem 15, 16 for transmission. A vehicle sensor 8' can be connected to an analog input 34 for transmitting sensor data SD. The analog input in the form of an electrical current or an electrical voltage is digitized in the powerline modem 15, 16 for transmission. The cableway controller 13, a memory unit 24 or a digital interface of a consumer 12 can be connected to a digital output 33 in order to transmit control data StD. An analog interface of a consumer 12 can be connected to an analog output 35 in order to transmit control data StD. Furthermore, a bus interface 36, for example a CAN, Ethernet/IP, Profinet, Profibus or Powerlink bus interface (to name a few, non-exhaustively) can be provided in order to be able to communicate with certain consumers 12 on the vehicle 4 or with the cableway controller 13 using a predetermined bus protocol. Such a consumer or the cableway controller 13 naturally also has a corresponding bus interface. The functions of the powerline modem 15, 16 can be controlled using a modem control unit 30. Likewise, a voltage supply input (not shown) can be provided on the powerline modem 15, 16, or the voltage supply is realized via the coupling stage 31.

The busbar 10 (two-phase in FIG. 2 for phase and neutral conductor or #DC) can be supplied with electrical energy via an electrical supply line 18 (two-phase in FIG. 2) from an electrical power supply 17 of the cableway 1, for example with ±24 VDC. The control powerline modem 16, which is connected to the cableway controller 13, can be connected to the supply line 18. Of course, the control powerline modem 16 can also be integrated in the cableway controller 13.

The electrical supply of the busbar 10 by the power supply 17 can also be interrupted by means of a separating unit 21, for example controlled by the cableway controller 13. The separating unit 21 is preferably to be provided such that the electrical connection between the control powerline modem 16 and the busbar 10 is not interrupted as a result, but rather only the electrical supply of the busbar 10.

However, the busbar 10 does not have to be energized actively by a power supply 17 for powerline communication. The busbar 10 only has to establish the electrical connection between a vehicle powerline modem 15 and the control powerline modem 16 at the desired locations.

If the current collector 11 of the vehicle 4 electrically contacts the busbar 10, there is an electrical connection between the vehicle powerline modem 15 and the control powerline modem 16, via which powerline communication can take place. Vehicle data FD can thus be transmitted from a vehicle powerline modem 15 to the control powerline modem 16, or vice versa. Any data communication protocol can be implemented for this purpose. Existing devices of the cableway 1 can therefore be used for the transmission of vehicle data FD. Only powerline modems 15, 16 are to be additionally provided, but this is possible with little effort and cost.

A sensor evaluation unit 14 can likewise be supplied with electrical energy via the supply line 22. The sensor evaluation unit 14 is preferably active when the supply line 22 is voltage-carrying. For this purpose, a voltage converter 19 can also be provided in order to generate a required supply voltage of the sensor evaluation unit 14, for example 5 VDC. However, the sensor evaluation unit 14 and the vehicle powerline modem 15 can also be supplied by an electrical energy storage 20 on the vehicle 4, for example a battery (lead battery, super capacitor, lithium ion battery, etc.). In times in which there is no power supply via a busbar 10, the electrical energy storage 20 can be used, for example, and otherwise the busbar 10. If the vehicle 4 is not connected to the busbar 10, an electrical supply of certain consumers 12 of the vehicle 4 can also be maintained if necessary, at least for a certain period of time, by means of the energy storage 20. The energy storage 20 can therefore also be used for supplying power to a vehicle powerline modem 15 for performing powerline communication. If necessary, the energy storage 20 can also be charged via the busbar 10.

A known power line coupling network, for example a transformer, a filter, etc., can also be provided between the vehicle powerline modem 15 and/or the control powerline modem 16 (or also both) and the current collector 11 or the busbar 10. Such a power line coupling network can of course also be integrated in the respective powerline modem 15, 16.

A rectifier 23, for example a diode bridge rectifier, can also be provided in the supply line 22 between the closure drive 3 and the energy store 20. The rectifier 23 can generate a unipolar feed voltage for the sensor evaluation unit 14 and/or other consumers 12 from a bipolar supply voltage (e.g. ±24 VDC) or an AC voltage as a supply voltage, also via a voltage converter 19. At the same time, the rectifier 23 also ensures the absence of reaction of the energy storage 20 in the direction of the closure drive 3, because the rectifier does not permit any energy flow in the opposite direction. Such a rectifier 23 must, of course, not interrupt the powerline communication, and is therefore to be arranged accordingly in the vehicle 4.

In order to prevent disturbances due to the powerline communication via the electrical lines, a low-pass filter for decoupling the supply voltage and the powerline communication can also be provided in front of a consumer 12 of the vehicle 4. The same can of course also be provided on the side of the cableway controller 13 upstream of the power supply 17.

Figure 4:
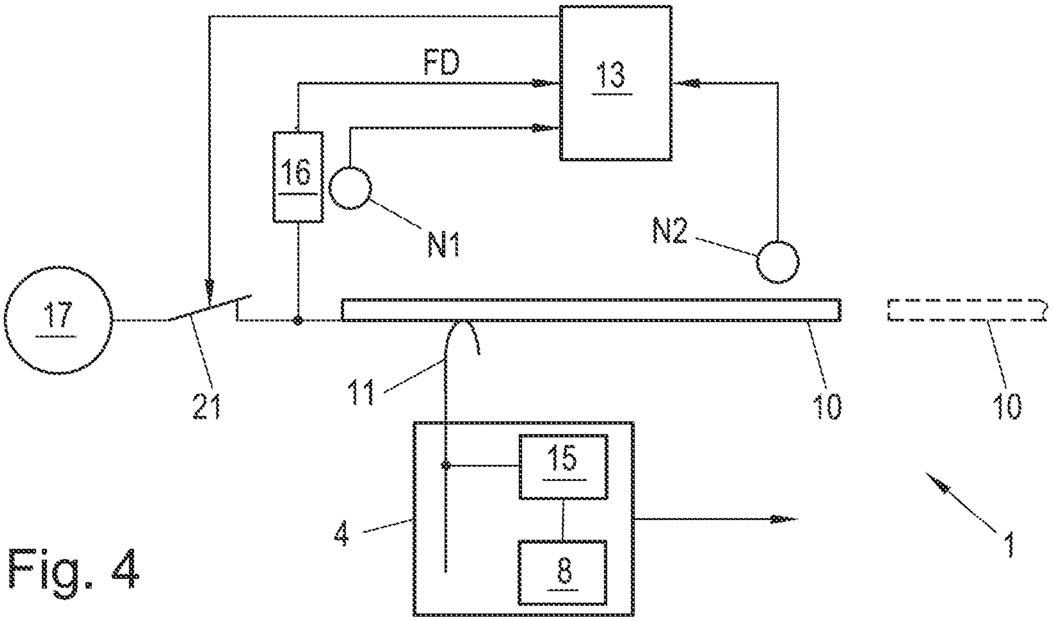
FIG. 4 is a schematic view of an embodiment for transmitting vehicle data by powerline communication.

In order to transmit vehicle data FD by means of powerline communication from the vehicle 4 to the cableway controller 13, or vice versa, it is possible to proceed as follows, with reference to FIG. 4.

The vehicle 4 moves in the direction of movement (indicated by the arrow), for example in a station 2. If the vehicle 4 comes into the region of a busbar 10, for example in a station 2 or on a cableway support, the busbar 10 can be activated, for example by the separation unit 21 of the power supply 17 (which was previously open) being closed. This can be triggered by the cableway controller 13. The activation of the busbar 10 preferably takes place after the current collector 11 has contacted the busbar 10 in order to prevent sparking. For this purpose, for example, a first proximity switch N1 can be provided in the station 2, which switch detects the position of the vehicle 4. The position of the vehicle 4 can, of course, also be detected in any other way, for example by evaluating the known speeds of the vehicle 4 in the station 2 or on the cable 9. Upon activation of the busbar 10, the vehicle powerline modem 15, 15' can start up if it was previously inactive. Likewise, consumers 12, such as a vehicle sensor 8, 8' or a memory unit 24 can thus start up if they were previously inactive. If a vehicle sensor 8, 8' or the memory unit 24 are supplied with electrical energy by an energy storage 20 of the vehicle 4, the start-up can naturally be omitted. As soon as the vehicle powerline modem 15, 15' is active, the connection establishment can begin. This means, for example, that the carrier frequency of the power line communication is generated and is applied by the vehicle powerline modem 15 to the current collector 11, as a result of which the powerline communication with the control powerline modem 16 can take place. Alternatively, the vehicle powerline modem 15, 15' detects a carrier frequency of the control powerline modem 16. The startup and the connection establishment take approximately 1 to 2 seconds. If the energy storage 20 is sufficiently dimensioned, then the vehicle powerline modem 15 can also be permanently active and the start-up can also be omitted.

However, it should be noted that the first busbar 10 can also be energized before the contact of the current collector 11 or also permanently, for example if the resulting sparking does not constitute a problem. However, an interruption of the current flow at the time of contact in order to prevent sparking could also be implemented on the vehicle side. In these embodiments, the first proximity switch N1 can also be dispensed with.

If the first busbar 10 is used only for powerline communication and not to transmit electrical energy from the station 2 to the vehicle 4, the first proximity switch N1 can also be dispensed with.

As long as the vehicle 4 is connected to the busbar 10 via the current collector 11, powerline communication with the cableway controller 13 can take place in order to exchange vehicle data FD. During this time, the vehicle data FD, such as a vehicle identification FID, sensor values SD, processed sensor values, control data StD, etc., can be transmitted from the vehicle 4 to the cableway controller 13, or vice versa.

The busbar 10 is deactivated preferably before the connection between the current collector 11 of the vehicle 4 and the busbar 10 is terminated by the movement of the vehicle 4. A second proximity switch N2 can also be provided for this purpose, by means of which a specific position of the vehicle 4 in the region of the busbar 10 is signaled to the cableway controller 13. As described above, a different position detection can also be provided instead of the second proximity sensor N2. During deactivation, the current collector 11 is preferably still in contact with the busbar 10, and the deactivation can take place by means of the cableway controller 13 by opening the separating unit 21 of the power supply 17. After the busbar 10 has been deactivated, the energy storage 20 can continue to supply the vehicle powerline modem 15, 15' with electrical energy, at least for a certain period of time. As long as the vehicle 4 is in contact with the busbar 10 via the current collector 11, the powerline communication can be maintained.

It is also conceivable for the cableway controller 13 to first signal to the vehicle 4, by means of control data StD of the powerline communication, which vehicle data FD are to be transmitted. This can take place, for example, by the implemented data communication protocol.

Between the time of deactivation of the busbar 10 and the reaching of the end of the busbar 10, at which the contact between the current collector 11 and the busbar 10 is interrupted by the movement of the vehicle 4, the powerline communication to the cableway controller 13 can continue to take place by means of the powerline modems 15, 16. This can be used, for example, to terminate the powerline communication in an orderly manner. The energy storage 20 is therefore preferably dimensioned accordingly, in order to be able to provide the electrical power required for the powerline communication during this period. The reaching of the end of the busbar 10 can again be detected by means of a third proximity switch (not shown) or by any other position detection.

Figure 3:
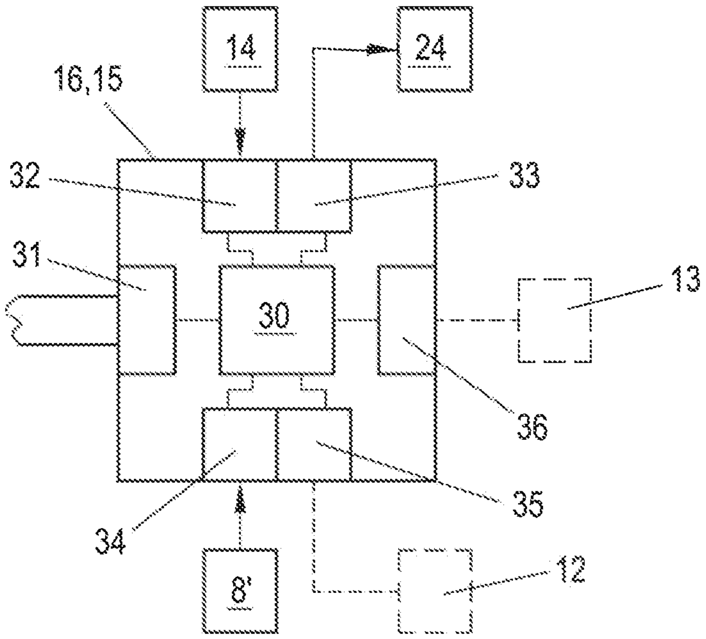
FIG. 3 is a schematic view of an embodiment of a powerline modem for powerline communication.

Further busbars 10 can be provided in the cableway 1, as indicated in FIG. 3. As soon as the vehicle 4 is in contact with a further busbar 10 by its movement, the powerline communication can again be initiated in order to exchange vehicle data FD.

A busbar 10 and/or a current collector 11 can also be heated to prevent icing which could interfere with the powerline communication.

Exemplary embodiments of the disclosure have been described above to explain the principles of the present disclosure and its practical application to thereby enable others skilled in the art to utilize the present disclosure. However, as various modifications could be made in the constructions and methods herein described and illustrated without departing from the scope of the present disclosure, it is intended that all matter contained in the foregoing description or shown in the accompanying drawings, including all materials expressly incorporated by reference herein, shall be interpreted as illustrative rather than limiting. Thus, the breadth and scope of the present disclosure should not be limited by the above-described exemplary embodiment but should be defined only in accordance with the following claims appended hereto and their equivalents.

The invention claimed is:

1. A method for data communication between a cableway controller and at least one vehicle of a cableway, comprising the steps of:

wherein during operation of the cableway a current collector of the vehicle contacts a busbar by a movement of the vehicle, wherein the busbar is located at a station of the cableway and extends in the direction of movement of the vehicle only along a part of a range of movement of the vehicle characterized in that a vehicle powerline modem of the vehicle is connected to the current collector, and a control powerline modem is connected to the busbar and the cableway controller; and wherein, while the current collector contacts the busbar, a power line communication connection between the vehicle powerline modem and the control powerline modem is established via the busbar, via which connection vehicle data are transmitted between the vehicle and the cableway controller, wherein the busbar is activated after the current collector has contacted the busbar in order to supply the vehicle with electrical energy, wherein the busbar is deactivated before the connection between the current collector of the vehicle and the busbar is terminated by the movement of the vehicle, and wherein between the time of deactivation of the busbar and reaching of the end of the busbar, at which the contact between the current collector and the busbar is interrupted by the movement of the vehicle, the powerline communication to the cableway controller continues to take place by means of the vehicle powerline modems and the control powerline modem.

2. The method according to claim 1, further comprising the step of controlling a consumer of the vehicle using vehicle data in the form of control data which are transmitted to the vehicle from the cableway controller via the powerline communication.

3. The method according to claim 1, further comprising the step of controlling or monitoring the cableway with the cableway controller using the vehicle data in the form of sensor data which are generated on the vehicle by a vehicle sensor and are transmitted between the vehicle and the cableway controller by means of the powerline communication.

4. The method according to claim 3, further comprising the steps of, storing the sensor data, during a period of time without contact between the current collector and the busbar, in a memory unit of the vehicle; and transmitting the sensor data to the cableway controller from the memory unit via the vehicle powerline modem during a period of time with contact between the current collector and the busbar.

5. The method according to claim 4, wherein the step of storing the sensor data further comprises storing the sensor data together with a time stamp of generation of the sensor data.

6. The method according to claim 1, further comprising the step of supplying the vehicle with electrical energy at least temporarily via the busbar when the current collector is in contact with the busbar.

7. A cableway having data communication between at least one vehicle and a cableway controller of the cableway, comprising, a busbar on the cableway, wherein the busbar is located at a station of the cableway and extends in a direction of movement of the at least one vehicle only along a part of a range of movement of the at least one vehicle;

a current collector on the vehicle, wherein the current collector is configured to contact the busbar by the movement of the vehicle during operation of the cableway;

a vehicle powerline modem on the vehicle and connected with the current collector;

a control powerline modem on the cableway and connected with the busbar and the cableway controller, and wherein while the current collector contacts the busbar, a powerline communication connection is established between the vehicle powerline modem via the busbar and the control powerline modem, the powerline communication connection being configured to transmit vehicle data between the vehicle and the cableway controller, wherein the busbar is activated after the current collector has contacted the busbar in order to supply the vehicle with electrical energy, wherein the busbar is deactivated before the connection between the current collector of the vehicle and the busbar is terminated by the movement of the vehicle, and wherein between the time of deactivation of the busbar and reaching of the end of the busbar, at which the contact between the current collector and the busbar is interrupted by the movement of the vehicle, the powerline communication to the cableway controller continues to take place by means of the vehicle powerline modems and the control powerline modem.

8. The cableway according to claim 7, wherein the cableway controller is furthered configured to transmit the vehicle data in the form of control data to the vehicle by the control powerline modem, and further comprising a consumer on the vehicle and controllable using the control data.

9. The cableway according to claim 7, further comprising:

a vehicle sensor on the vehicle and configured to generate the vehicle data in the form of sensor data;

wherein the vehicle is further configured to transmit the sensor data to the cableway controller with the vehicle powerline modem via powerline communication; and wherein the cableway controller is configured to control or monitor the cableway on the basis of the sensor data.

10. The cableway according to claim 9, further comprising:

a memory unit on the vehicle and configured to store generated sensor data during a period of time without contact between the current collector and the busbar; and wherein the vehicle further configured to transmit the stored sensor data from the memory unit to the cableway controller (13) with the vehicle powerline modem via powerline communication during a period of time with contact between the current collector and the busbar.

11. The cableway according to claim 10, wherein the memory unit is further configured to store the generated sensor data together with a time stamp of generation of the sensor data.

12. The cableway according to claim 7, wherein the busbar is further configured to supply the vehicle with electrical power when the current collector of the vehicle contacts the busbar.

* * * * *